US012670417B1

(12) United States Patent
Chen et al.

(10) Patent No.: US 12,670,417 B1
(45) Date of Patent: Jun. 30, 2026

(54) METHOD AND DEVICE FOR DENOISING CAUSAL RELATION EXTRACTION BASED ON MULTI-TASK COLLABORATIVE LEARNING

(71) Applicant: National University of Defense Technology, Changsha (CN)

(72) Inventors: Wanyu Chen, Changsha (CN); Yijia Zhang, Changsha (CN); Haoen Huang, Changsha (CN); Chaofan Liu, Changsha (CN); Fei Cai, Changsha (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 19/405,464

(22) Filed: Dec. 2, 2025

(51) Int. Cl.
*G06N 5/04* (2023.01)
*G06F 18/213* (2023.01)
(Continued)

(52) U.S. Cl.
CPC .............. *G06N 5/04* (2013.01); *G06F 18/213* (2023.01); *G06F 18/22* (2023.01); *G06F 40/295* (2020.01);
(Continued)

(58) Field of Classification Search
CPC ........ G06N 5/04; G06N 3/0442; G06N 3/048; G06N 3/084; G06N 3/0895; G06F 18/213; G06F 18/22; G06F 40/295
See application file for complete search history.

(56) References Cited

U.S. PATENT DOCUMENTS

2020/0401910 A1* 12/2020 Hassanzadeh ........ G06F 16/903
2021/0117840 A1*  4/2021 Chikahara .......... G06F 18/2431
(Continued)

FOREIGN PATENT DOCUMENTS

CN      109871955 A      6/2019
CN      114492460 A      5/2022
(Continued)

OTHER PUBLICATIONS

Zhang et al. ("Multi-Task Sequence Tagging for Denoised Causal Relation Extraction", Published: May 24, 2025) (Year: 2025).*
(Continued)

*Primary Examiner* — Imad Kassim
(74) *Attorney, Agent, or Firm* — Nitin Kaushik

(57) ABSTRACT

Disclosed is a causal relation extraction method, specifically relating to a method and a device for denoising causal relation extraction based on multi-task collaborative learning. The method includes: inputting a text to be processed into a task-sharing layer of a denoising causal relation extraction model based on multi-task collaborative learning for feature extraction to obtain an extraction result; inputting the extraction result into the task-specific layer of the denoising causal relation extraction model based on multi-task collaborative learning to perform part-of-speech tagging, chunking analysis, and causal extraction tasks, to obtain feature labels corresponding to the tasks; performing causal strength classification and causal relation extraction tasks; conducting causal strength representation learning based on counterfactual negative sample contrastive learning, using a gating generator to obtain channel gains and temperature control coefficients, which are applied to gated attention calculation, to realize causal strength classification and guide extraction of causal relations through causal strength.

15 Claims, 5 Drawing Sheets

(51) Int. Cl.
  *G06F 18/22*      (2023.01)
  *G06F 40/295*     (2020.01)
  *G06N 3/0442*     (2023.01)
  *G06N 3/048*      (2023.01)
  *G06N 3/084*      (2023.01)
  *G06N 3/0895*     (2023.01)
(52) U.S. Cl.
  CPC ........... *G06N 3/0442* (2023.01); *G06N 3/048* (2023.01); *G06N 3/084* (2013.01); *G06N 3/0895* (2023.01)

(56)              References Cited

U.S. PATENT DOCUMENTS

2023/0214695 A1* 7/2023 Wu ......................... G06N 3/045
                                          706/46

2024/0112092 A1* 4/2024 Sharpe ................... G06N 20/20
2024/0289656 A1* 8/2024 Sato ....................... G06N 5/047

FOREIGN PATENT DOCUMENTS

CN        115358936 A     11/2022
CN        116431789 A      7/2023

OTHER PUBLICATIONS

Li et al. ("Causality extraction based on self-attentive BILSTM-CRF with transferred embeddings", Neurocomputing 423 (2021) 207-219) (Year: 2021).*
Guo et al. ("Causal intervention for knowledge graph denoising in recommender systems", 2014, 16:8551-8567) (Year: 2014).*

* cited by examiner

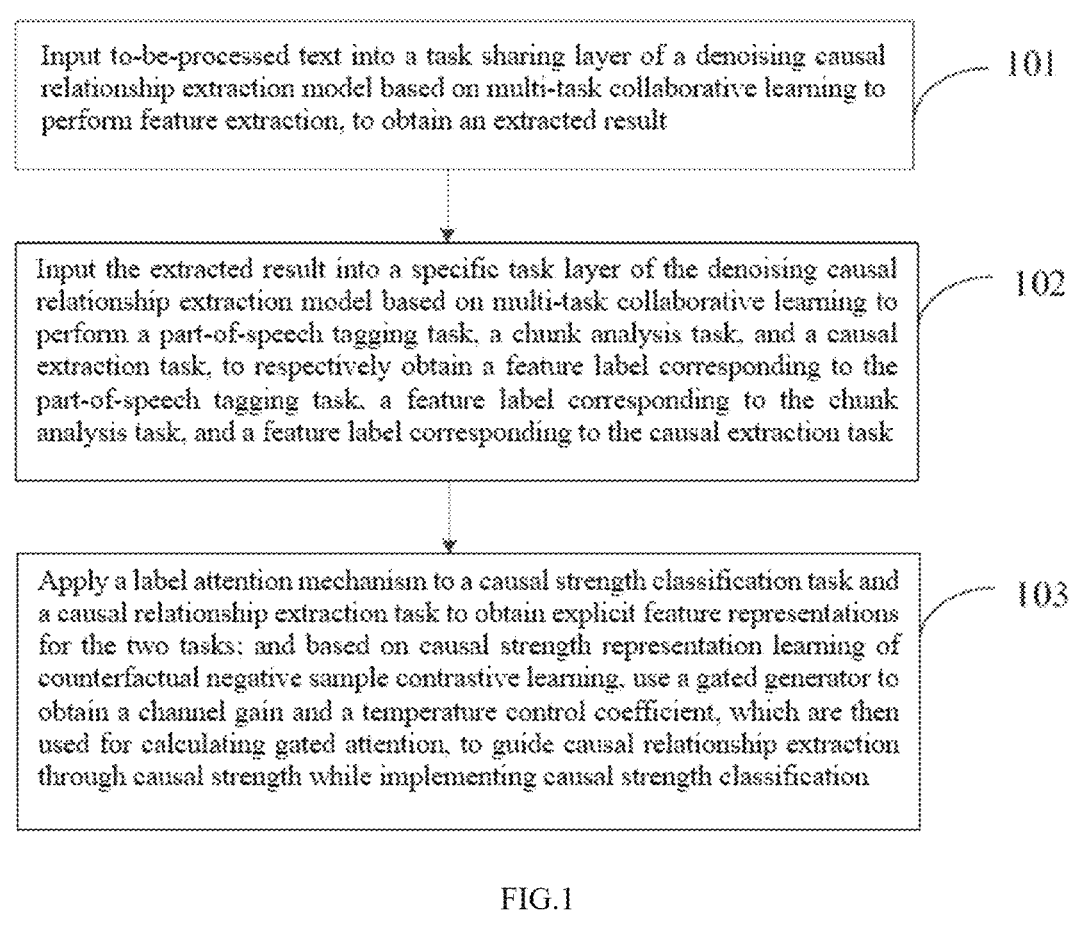

Input to-be-processed text into a task sharing layer of a denoising causal relationship extraction model based on multi-task collaborative learning to perform feature extraction, to obtain an extracted result — 101

Input the extracted result into a specific task layer of the denoising causal relationship extraction model based on multi-task collaborative learning to perform a part-of-speech tagging task, a chunk analysis task, and a causal extraction task, to respectively obtain a feature label corresponding to the part-of-speech tagging task, a feature label corresponding to the chunk analysis task, and a feature label corresponding to the causal extraction task — 102

Apply a label attention mechanism to a causal strength classification task and a causal relationship extraction task to obtain explicit feature representations for the two tasks; and based on causal strength representation learning of counterfactual negative sample contrastive learning, use a gated generator to obtain a channel gain and a temperature control coefficient, which are then used for calculating gated attention, to guide causal relationship extraction through causal strength while implementing causal strength classification — 103

FIG.1

METHOD AND DEVICE FOR DENOISING CAUSAL RELATION EXTRACTION BASED ON MULTI-TASK COLLABORATIVE LEARNING

TECHNICAL FIELD

The present disclosure belongs to a causal relation extraction method, and specifically relates to a method and a device for denoising causal relation extraction based on multi-task collaborative learning.

BACKGROUND

As an important task in Natural Language Processing (NLP), Event Causality Extraction (CE) plays an indispensable role in various downstream applications, such as knowledge graphs, event logic graphs and question answering systems. Causal relation extraction is highly challenging, as it requires the ability to capture rich semantic information and complex linguistic phenomena. Conventional methods use sequence labeling tasks to accomplish CE, and these methods have achieved much better performance than conventional methods. Subsequently, by introducing pre-trained language models (e.g., ElMo and BERT), the understanding ability of the model can also be improved, thereby enhancing the model's performance.

However, these methods often face the problem of noisy data. This is mainly because some words in the text are unlikely to be labeled as "Cause" or "Effect", and semantic components such as adjectives and prepositions cannot point to a specific entity, introducing noise into the labeling of causal entities. Conventional sequence labeling frameworks tend to make incorrect predictions, where some adjectives and prepositions are indistinguishably predicted as "Cause" or "Effect". For example, experiments were conducted on the SemEval-2010 Task 8 dataset, Event StoryLine corpus, and Causal TimeBank, using the BiLSTM+CRF model for sequence labeling to study the impact of noisy data (such as adjectives and prepositions) on model performance. The experimental results show that in the first two samples of the SemEval-2010 Task 8 dataset, BERT labeled "blind" as "B-Cause" without considering the part-of-speech of the word, and a similar problem occurred in the Causal Time-Bank cases. In addition, in the Event StoryLine samples, "off" was labeled as "B-Cause". Therefore, conventional sequence labeling frameworks tend to make incorrect predictions, where some adjectives and prepositions are indistinguishably predicted as "Cause" or "Effect".

It can be concluded that the causal extraction methods commonly used in the prior art are mainly limited to causal relation extraction in a single domain and cannot effectively handle causal relations across multiple domains, resulting in low extraction accuracy. Moreover, in determining causal relations, the prior art does not fully consider the characteristic of the strength of the extracted causal relations. Especially in the case of complex causal relations, the prior art merely relies on "parallel learning of causal strength and causal relations", which neither accurately and effectively realizes the extraction of causal relations norclassifies and determines specific causal strengths.

SUMMARY

An objective of the present disclosure is to provide a method for denoising causal relation extraction based on multi-task collaborative learning, so as to solve the technical problems that the prior art is mainly limited to causal relation extraction in a single domain, and unable to effectively handle causal relations across multiple domains, and the conventional "parallel learning of causal strength and causal relations" also makes it difficult to achieve accurate causal relation extraction and causal strength classification.

The method for denoising causal relation extraction based on multi-task collaborative learning includes:

inputting a text to be processed into a task-sharing layer of a denoising causal relation extraction model based on multi-task collaborative learning for feature extraction to obtain an extraction result;

inputting the extraction result into the task-specific layer of the denoising causal relation extraction model based on multi-task collaborative learning to perform a part-of-speech tagging task, a chunking analysis task, and a causal extraction task, and obtaining a feature label corresponding to the part-of-speech tagging task, a feature label corresponding to the chunking analysis task, and a feature label corresponding to the causal extraction task respectively, where a first layer of the denoising causal relation extraction model based on multi-task collaborative learning is obtained by parallel training of the part-of-speech tagging task, the chunking analysis task and the causal extraction task; and applying a label attention mechanism to a causal strength classification task and a causal relation extraction task to obtain explicit feature representations of the two tasks; and conducting causal strength representation learning based on counterfactual negative sample contrastive learning, using a gating generator to obtain a channel gain and a temperature control coefficient, which are applied to gated attention calculation, so as to realize causal strength classification and guide the extraction of causal relations through causal strength.

Optionally, the first layer of the denoising causal relation extraction model based on multi-task collaborative learning includes:

a part-of-speech tagging task subnet, including a first task-sharing sublayer and a first task-specific sublayer, where the first task-sharing sublayer is used for feature extraction on the text to be processed to obtain a first extraction result, and the first task-specific sublayer is used for part-of-speech tagging based on the first extraction result to obtain a feature label corresponding to the part-of-speech tagging task;

a chunking analysis task subnet, including a second task-sharing sublayer and a second task-specific sublayer, where the second task-sharing sublayer is used for feature extraction on the text to be processed to obtain a second extraction result, and the second task-specific sublayer is used for chunking analysis based on the second extraction result to obtain a feature label corresponding to the chunking analysis task; and a causal relation extraction task subnet, including a third task-sharing sublayer and a third task-specific sublayer, where the third task-sharing sublayer is used for feature extraction on the text to be processed to obtain a third extraction result, and the third task-specific sublayer is used for causal extraction based on the third extraction result to obtain a feature label corresponding to the causal extraction task, where the task-sharing layer includes the first task-sharing sublayer, the second task-sharing sublayer and the third task-sharing sublayer, and the task-specific layer includes the first task-specific sublayer, the second task-specific sublayer and the third task-specific sublayer.

Optionally, the first task-sharing sublayer includes a first BERT semantic extraction layer and a first BiLSTM layer connected in sequence; the second task-sharing sublayer includes a second BERT semantic extraction layer and a second BiLSTM layer connected in sequence; and the third task-sharing sublayer includes a third BERT semantic extraction layer and a third BiLSTM layer connected in sequence, where part of parameters of the first BERT semantic extraction layer, the second BERT semantic extraction layer and the third BERT semantic extraction layer are the same; and part of parameters of the first BiLSTM layer, the second BiLSTM layer and the third BiLSTM layer are the same.

Optionally, the first task-specific sublayer includes a first feature conversion layer and a first label prediction layer connected in sequence; the second task-specific sublayer includes a second feature conversion layer and a second label prediction layer connected in sequence; and the third task-specific sublayer includes a third feature conversion layer and a third label prediction layer connected in sequence.

Optionally, the method further includes:

performing iterative training on a first layer of a to-be-trained denoising causal relation extraction model based on multi-task collaborative learning to obtain the denoising causal relation extraction model based on multi-task collaborative learning, where during the iterative training process, part of parameters of the part-of-speech tagging task subnet, the chunking analysis task subnet, and the causal relation extraction task subnet are iteratively pruned.

Optionally, a loss function for iterative training of the first layer of the to-be-trained denoising causal relation extraction model based on multi-task collaborative learning is:

$$\text{loss}_{task} = \{\text{loss}_{CE}, \text{loss}_{pos\ tagging}, \text{loss}_{chunk\ analysis}\};$$

$$\text{loss}_{task} = -\log p(Y_{true} \mid X);$$

$$\log p(Y_{true} \mid X) = s(X, Y_{true}) - \log \sum\nolimits_{\tilde{Y} \in Y_x} e^{s(X, \tilde{Y})},$$

where $Y_{true}$ is used to represent a ground-truth label sequence, $Y_X$ is used to represent all possible label sequences, $s(\cdot)$ is used to represent a score of a label sequence, $\text{loss}_{CE}$ is used to represent a loss function generated by the causal extraction task, $\text{loss}_{pos\ tagging}$ is used to represent a loss function generated by the part-of-speech tagging task, and $\text{loss}_{chunk\ analysis}$ is used to represent a loss function generated by the chunking analysis task.

Optionally, during a $n^{th}$ iterative training, a pruning rate for iteratively pruning part of parameters of the part-of-speech tagging task subnet, the chunking analysis task subnet, and the causal relation extraction task subnet satisfies:

$$p = (1 - \alpha)^{\frac{1}{n}},$$

where p is used to represent the pruning rate of each iteration, and $\alpha$ is used to represent a percentage of parameters retained in the part-of-speech tagging task subnet, the chunking analysis task subnet, and the causal relation extraction task subnet after the completion of iterative training.

Optionally, a second layer of the denoising causal relation extraction model based on multi-task collaborative learning includes a label attention module, a causal strength classification task, and a causal strength prior gated attention; the label attention module applies the label attention mechanism to the causal strength classification task and the causal relation extraction task to obtain explicit feature representations of the two tasks, including token representation $H_S$ for causal relation extraction and token representation $H_R$ for causal strength classification; causal relations are used to guide causal strength learning, a transformer-based attention mechanism is adopted to perform representation learning for causal strength classification, and causal strength representation $H_R$ that contains causal relations is obtained; the causal strength representation learning based on counterfactual negative sample contrastive learning is also adopted; and the causal strength prior gated attention embeds the learned causal strength representation into attention representation of causal relation extraction, so as to guide the extraction of causal relations.

Optionally, matrix $H_S$ and matrix $H_R$ are respectively mapped to Query matrix $Q_S$, Key matrix $K_S$, Value matrix $V_S$, as well as Query matrix $Q_R$, Key matrix $K_R$, Value matrix $V_R$ by using different linear projections; then, the representation $C_R$ of the causal strength classification task after attention calculation is computed; and the specific calculation of the causal strength representation $H_R$ that contains causal relations is shown in the following formula:

$$C_R = \text{Softmax}\left(\frac{Q_R K_S^T}{\sqrt{d_k}}\right) V_S$$

$$H_R' = LN(H_R + C_R),$$

where LN represents a normalization function of this layer, and $d_k$ is a dimension of a key vector;

the causal strength representation learning based on counterfactual negative sample contrastive learning includes: selecting a series of tokens with different meanings during training, then calculating representations through cosine similarity, and finding several representations with the smallest similarity as negative samples to implement contrastive learning, a contrastive loss being as follows:

$$\mathcal{L}_{cl}^R = -\log \frac{\exp(\phi(H_R, H_R')/\tau)}{\sum_{H_S^{neg} \in O} \exp(\phi(H_R, H_R^{neg})/\tau)}$$

where O represents a feature set of negative samples, t represents a temperature control coefficient, and $\phi$ represents a similarity function.

Optionally, a calculation method for obtaining the channel gain and the temperature control coefficient by the gate generator of the causal strength prior gated attention is as follows:

$$\gamma = \sigma(W_g H_R + b_g)$$

$$\beta = \text{softplus}(W_\beta H_R + b_\beta)$$

where σ is a Sigmoid function, and softplus=log $(1+e^{-x})$, which is used to ensure that β is a continuous positive value; the channel gain γ acts as a feature-wise gating, and γ introduces conditional sparsity in the latent space through dimension-wise rescaling of Query and Key; a temperature coefficient β>0 acts as a distribution sharpness controller, and β enters the denominator of softmax in a multiplicative manner to directly adjust an attention entropy.

Optionally, the gated attention calculation includes: for the input query $Q_S$, key $K_S$, and value $V_S$, sequentially performing dimension-wise gating, temperature scaling, and normalization to obtain a causal relation representation $H'_S$ containing causal strength, with the calculation formulas as follows: $Q'=\gamma\odot Q_S$, $K'=\gamma\odot K_S$; $S=Q'K'/(\sqrt{dB})$; $A=$ softmax(S), $H'_S=AV_S$; then, concatenating the two vectors $H'_R\in R^{n\times d}$ and $H'_S\in R^{n\times d}$ to obtain a new vector $H_{SR}$; then, for each word in the sentence, using a feature representation of the word to obtain semantic information of the words before and after the word; finally, implicitly fusing causal strength information and causal relation information through a feedforward neural network, and obtaining output vectors $\widetilde{H_S}$ and $\widetilde{H_R}$ of the two tasks respectively through a normalization function.

Optionally, in the causal strength classification task, a max-pooling operation is applied to $\tilde{H}_R$ to obtain a semantic representation C of the sentence, which is used as an input to a Softmax function, and a label $O_R$ of the causal strength is obtained through the following formula, where $w_R$ and $b_R$ are respectively a weight matrix and bias term of the causal strength; and the calculation formula is as follows:

$$p_R = Softmax(w_R C + b_R)$$

$$O_R = \text{argmax}(p_R)$$

the causal classification task adopts the same crf decoder and corresponding loss function as those used in the first layer.

The present disclosure also provides a denoising causal relation extraction device based on multi-task collaborative learning. The denoising causal relation extraction device includes:

a feature extraction module, configured to input a text to be processed into a task-sharing layer of a denoising causal relation extraction model based on multi-task collaborative learning for feature extraction to obtain an extraction result; and a task-specific module, including a first layer and a second layer, where:

the first layer is configured to input the extraction result into the task-specific layer of the denoising causal relation extraction model based on multi-task collaborative learning to perform a part-of-speech tagging task, a chunking analysis task, and a causal extraction task, and obtain a feature label corresponding to the part-of-speech tagging task, a feature label corresponding to the chunking analysis task, and a feature label corresponding to the causal extraction task respectively, where the denoising causal relation extraction model based on multi-task collaborative learning is obtained by parallel training of the part-of-speech tagging task, the chunking analysis task and the causal extraction task; and the second layer applies a label attention mechanism to a causal strength classification task and a causal relation extraction task to obtain explicit feature representations of the two tasks; and conducting causal strength representation learning based on counterfactual negative sample contrastive learning, using a gating generator to obtain a channel gain and a temperature control coefficient, which are applied to gated attention calculation, so as to realize causal strength classification and guide the extraction of causal relations through causal strength.

The present disclosure further provides an electronic device, including: a memory, a processor, and a program stored in the memory and executable on the processor, where the processor is configured to read the program in the memory to implement the steps in the above-mentioned method for denoising causal relation extraction based on multi-task collaborative learning.

The present disclosure further provides a readable storage medium for storing a program, where the program, when executed by a processor, implements the steps in the above-mentioned method for denoising causal relation extraction based on multi-task collaborative learning.

In an embodiment of the present disclosure, the text to be processed is input into the task-sharing layer of the denoising causal relation extraction model based on multi-task collaborative learning for feature extraction to obtain an extraction result; the extraction result is input into the task-specific layer of the denoising causal relation extraction model based on multi-task collaborative learning to perform a part-of-speech tagging task, a chunking analysis task, and a causal extraction task, and feature labels corresponding to the part-of-speech tagging task, the chunking analysis task and the causal extraction task are obtained respectively, where the denoising causal relation extraction model based on multi-task collaborative learning is obtained by parallel training of the part-of-speech tagging task, the chunking analysis task and the causal extraction task.

The beneficial effects of the present disclosure are as follows: The present disclosure adopts a hierarchical multi-task learning framework, focuses on the capabilities of the model in different aspects in multi-task learning at different levels, and improves the performance of the model in different tasks.

The first layer of multi-task learning provides a causal relation extraction method that integrates multiple natural language processing tasks, which can solve the denoising problem in the causal relation extraction process according to the characteristics of different tasks. The first layer implements denoising causal relation extraction with multi-task collaborative learning. The part-of-speech tagging task, chunking analysis task and causal extraction task are performed simultaneously. Through parallel training of the three tasks, the model can learn information from the part-of-speech tagging task and chunking analysis task that are related to the causal extraction task. The trained denoising causal relation extraction model with multi-task collaborative learning can utilize shared knowledge and complementary information between different but related tasks, alleviate noise information in causal relation extraction, obtain additional relevant semantic information, reduce unreasonable causal relations, and improve the accuracy of causal relation extraction. Moreover, multi-task learning can capture more complex semantic interactions, master fine-grained semantic information, enable the model to effectively adapt to different data domains, and have better adaptability.

In the second layer, the present disclosure adopts a causal strength gated attention mechanism, which can use causal strength representations to improve the attention module for causal relation learning, enabling the model to assign more attention to the extraction of causal relations with high causal strength. Moreover, in this layer, the present disclosure simultaneously uses the channel gain and temperature coefficient determined based on causal strength to adjust the gated attention mechanism. The combination of the two enables the model to make accurate and fine-grained distinctions when dealing with "strong causality", and not be distracted by noise when dealing with "weak causality", resulting in a more stable and intelligent overall performance. Through a more fine-grained gated attention mechanism, the present disclosure enables the learned causal strength representations to be embedded into attention representations of causal relation extraction, more effectively guides the extraction of causal relations through causal strength, converts causal strength into attention weights for causal relation representation learning, and more accurately guides the extraction process of causal relations through causal strength.

In the training of the second layer, this method also improves the contrastive learning method. By utilizing the idea of counterfactuals, when selecting negative samples, tokens with similar representations but significantly different meanings can be selected. This ensures that the negative samples used for training are very close in the representation space but quite different in meaning, thereby enabling more effective contrastive learning. Finally, the multi-task sharing layer applied in this method uses a parameter sparse sharing mechanism and reduces the scale of training parameters through iterative pruning, which can promote the effective pruning of parameters in the sharing layer.

BRIEF DESCRIPTION OF DRAWINGS

FIG. 1 is a flowchart of a method for denoising causal relation extraction based on multi-task collaborative learning in the present disclosure.

DETAILED DESCRIPTION OF THE EMBODIMENTS

Figure 2:
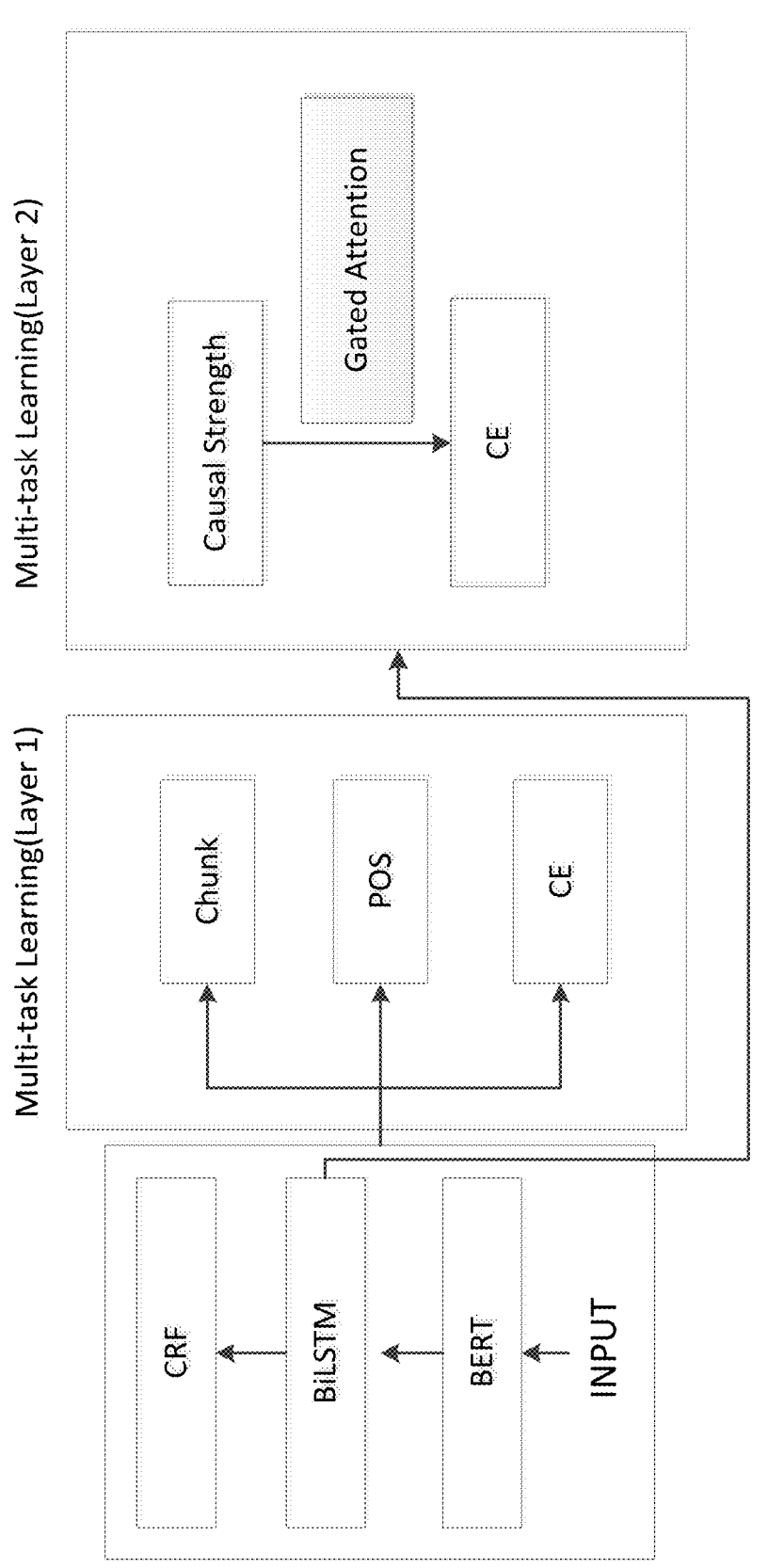
FIG. 2 is a schematic structural diagram of a denoising causal relation extraction model based on multi-task collaborative learning in the present disclosure.
Figure 3:
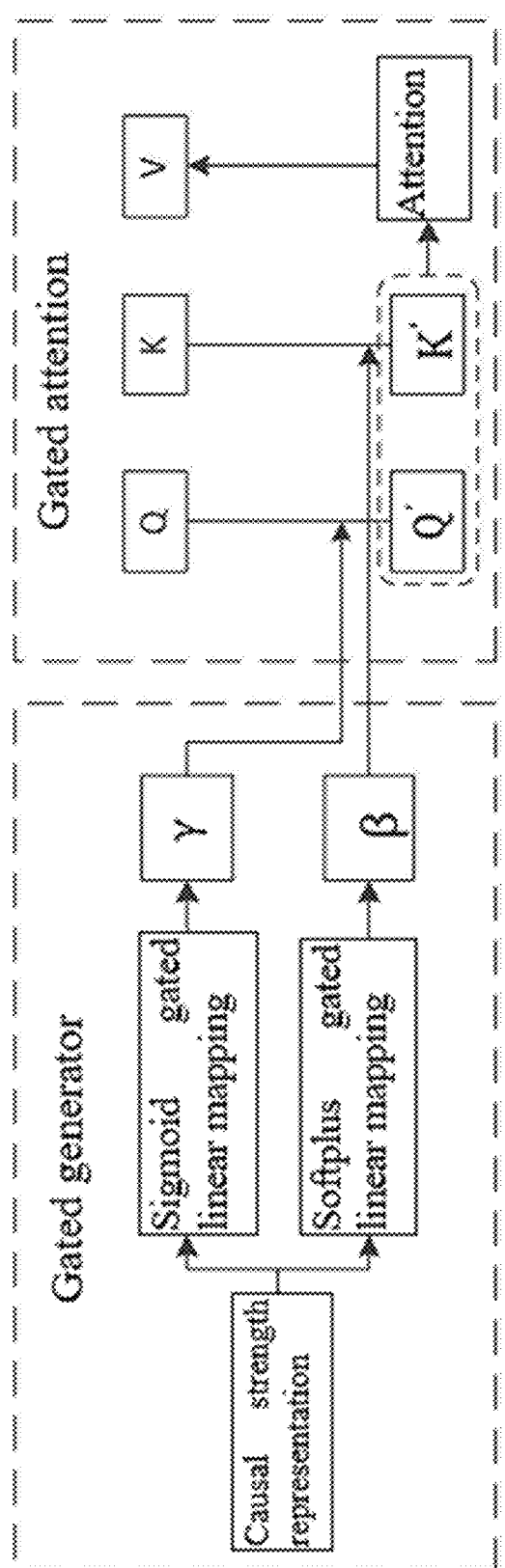
FIG. 3 is a flowchart of a causal strength prior gated attention mechanism in the present disclosure.

In embodiments of the present application, the term "and/or" describes the association relation between associated objects, indicating that there can be three types of relations. For example, A and/or B may mean: A exists alone, A and B exist simultaneously, or B exists alone. The character "/" generally indicates that the associated objects before and after it have an "or" relation. In the embodiments of the present application, the term "plurality" refers to two or more, and other quantifiers follow a similar rule. The terms "first" and "second" in the specification and claims of the present application are used to distinguish similar objects, and are not used to describe a specific order or sequence. It should be understood that such terms can be interchanged under appropriate circumstances, so that the embodiments of the present application can be implemented in an order other than those illustrated or described herein. Moreover, the objects distinguished by "first" and "second" are usually of one type, and the number of objects is not limited. For example, the first object can be one or multiple.

The following describes the technical solutions in the embodiments of the present application clearly and completely with reference to the accompanying drawings in the embodiments of the present application. Obviously, the described embodiments are only a part of the embodiments of the present application, rather than all the embodiments. Based on the embodiments in the present application, all other embodiments obtained by those of ordinary skill in the art without making creative efforts shall fall within the protection scope of the present application.

As shown in FIG. 1-FIG. 5, the present disclosure provides a method for denoising causal relation extraction based on multi-task collaborative learning, which specifically includes the following steps:

Step 101: Input a text to be processed into a task-sharing layer of a denoising causal relation extraction model based on multi-task collaborative learning for feature extraction to obtain an extraction result.

Step 102: Input the extraction result into the task-specific layer of the denoising causal relation extraction model based on multi-task collaborative learning to perform a part-of-speech tagging task, a chunking analysis task, and a causal extraction task, and obtaining a feature label corresponding to the part-of-speech tagging task, a feature label corresponding to the chunking analysis task, and a feature label corresponding to the causal extraction task respectively.

Step 103: Apply a label attention mechanism to a causal strength classification task and a causal relation extraction task to obtain explicit feature representations of the two tasks; and conducting causal strength representation learning based on counterfactual negative sample contrastive learning, use a gating generator to obtain a channel gain and a temperature control coefficient, which are applied to gated attention calculation, so as to realize causal strength classification and guide the extraction of causal relations through causal strength.

The denoising causal relation extraction model performs causal relation extraction and causal strength classification based on hierarchical multi-task learning. This adopts a hierarchical multi-task learning framework, focuses on the model's capabilities in different aspects during multi-task learning at different levels, and improves the model's performance on different tasks.

The tasks involved in the first layer of multi-task learning include the part-of-speech tagging task, the chunking analysis task and the causal extraction task, which are trained in parallel to obtain a trained model.

In the first layer, the method provided in the embodiment of the present application is mainly used for causal relation extraction, and the output result corresponding to the causal extraction task is the result obtained from causal relation extraction. Part-of-speech tagging and chunking analysis, as collaborative training tasks, are trained in parallel with the causal extraction task. They can denoise interference factors in a large number of semantic components, and improve the model's performance by learning information from other tasks related to the causal extraction task, thereby helping the model locate causal entities and realize causal relation extraction.

Specifically, Part-Of-Speech Tagging (POS) is proposed to assign grammatical tags to words in a sentence. Most causal relations involve nouns (denoted by the NN tag in POS tags), and part-of-speech tagging can help the model exclude annotations inconsistent with semantics when locating "cause" entities and "effect" entities. Chunking analysis groups words in a sentence into meaningful chunks and segments different semantic components across multiple spans, which also helps to minimize unreasonable causal relations based on part-of-speech tagging results. Moreover, multi-task learning enables the capture of more complex semantic interactions and the mastery of fine-grained semantic information, allowing the model to effectively adapt to different data domains and achieve better adaptability.

The denoising causal relation extraction model based on multi-task collaborative learning (Multitask with POS and Chunk for Causal Relation, MPC-CE) in the embodiment of the present application includes a task-sharing layer and a task-specific layer. First, after the text to be processed is input into the task-sharing layer, this layer is used to extract common features for predicting all tasks, and then enters the task-specific layer to implement specific tasks. The task-specific layer includes two layers. The first layer is mainly used for causal relation extraction. In this layer, features required for specific task label prediction are extracted, namely the label features corresponding to the part-of-speech tagging, chunking analysis, and causal extraction tasks respectively, so as to complete the part-of-speech tagging, chunking analysis, and causal extraction tasks to obtain output results. In this embodiment, the output results of each task are usually in the form of feature labels.

Optionally, in some embodiments, the first layer of the denoising causal relation extraction model based on multi-task collaborative learning includes:

a part-of-speech tagging task subnet, including a first task-sharing sublayer and a first task-specific sublayer, where the first task-sharing sublayer is used for feature extraction on the text to be processed to obtain a first extraction result, and the first task-specific sublayer is used for part-of-speech tagging based on the first extraction result to obtain a feature label corresponding to the part-of-speech tagging task;

a chunking analysis task subnet, including a second task-sharing sublayer and a second task-specific sublayer, where the second task-sharing sublayer is used for feature extraction on the text to be processed to obtain a second extraction result, and the second task-specific sublayer is used for chunking analysis based on the second extraction result to obtain a feature label corresponding to the chunking analysis task; and a causal relation extraction task subnet, including a third task-sharing sublayer and a third task-specific sublayer, where the third task-sharing sublayer is used for feature extraction on the text to be processed to obtain a third extraction result, and the third task-specific sublayer is used for causal extraction based on the third extraction result to obtain a feature label corresponding to the causal extraction task, where the task-sharing layer includes the first task-sharing sublayer, the second task-sharing sublayer and the third task-sharing sublayer, and the task-specific layer includes the first task-specific sublayer, the second task-specific sublayer and the third task-specific sublayer.

It should be understood that in the embodiment of the present application, a part-of-speech tagging task subnet is provided corresponding to the part-of-speech tagging task, a chunking analysis task subnet is provided corresponding to the chunking analysis task, and a causal relation extraction task subnet is provided corresponding to the causal extraction task. Each subnet is corresponding to its own task-sharing sublayer and task-specific sublayer. The task-sharing sublayers of the three subnets form the task-sharing layer, and the task-specific sublayers of the three subnets form the task-specific layer.

Optionally, in some embodiments, the first task-sharing sublayer includes a first BERT semantic extraction layer and a first BiLSTM layer connected in sequence; the second task-sharing sublayer includes a second BERT semantic extraction layer and a second BiLSTM layer connected in sequence; and the third task-sharing sublayer includes a third BERT semantic extraction layer and a third BiLSTM layer connected in sequence, where part of parameters of the first BERT semantic extraction layer, the second BERT semantic extraction layer and the third BERT semantic extraction layer are the same; and part of parameters of the first BiLSTM layer, the second BiLSTM layer and the third BiLSTM layer are the same.

The following is an introduction to the BERT semantic extraction layers (the first BERT semantic extraction layer, the second BERT semantic extraction layer, and the third BERT semantic extraction layer) and the BiLSTM layers (the first BiLSTM layer, the second BiLSTM layer, and the third BiLSTM layer).

BERT is a language representation model, standing for Bidirectional Encoder Representations from Transformers. The specific structure can be referred to in the description of related technologies, and will not be repeated here. In this embodiment, the BERT semantic extraction layer dynamically maps each word in a sentence to a feature vector based on contextual information according to the context.

Exemplarily, the text to be processed includes m words, and the text to be processed is denoted as a sequence $x=(x_1, x_2, \ldots, x_m)$. The BERT semantic extraction layer maps the input sequence $x=(x_1, x_2, \ldots, x_m)$ to:

$$t = (t_1, t_2, \ldots, t_m);$$

In specific implementation, the BERT mapping process involves considering various factors, such as polysemy, syntactic features of sentences, and the like, and will not be repeated here.

Bidirectional Long Short-Term Memory (BiLSTM) is an improved Recurrent Neural Network (RNN), specifically designed to process sequence data. For each input sequence of the BiLSTM layer, both the forward Long Short-Term Memory (LSTM) and the backward LSTM need to encode it into hidden vectors. In this embodiment, the hidden states of the two directions are concatenated to generate a complete sequence, which helps capture the positional information of each word in the sentence.

The output sequence of the forward LSTM hidden states is:

$$\vec{h} = (\vec{h_1}, \vec{h_2}, \cdots, \vec{h_m}),$$

The output sequence of the backward LSTM hidden states is:

$$\overleftarrow{h} = \left(\overleftarrow{h_1}, \overleftarrow{h_2}, \cdots, \overleftarrow{h_m}\right).$$

By combining the output sequence of the forward LSTM hidden states and the output sequence of the backward LSTM hidden states, the complete output sequence h of the BiLSTM hidden states is obtained:

$$h_t = \left[\overrightarrow{h_t}; \overleftarrow{h_t}\right] \in R^n;$$

$$h = (h_1, h_2, \cdots, h_m) \in R^{m \times n},$$

where t represents the position of a word in the sentence, m represents the number of words in the sentence, and n represents a dimension of the vector.

It should be understood that the task-sharing sublayers of the three subnets each include a BERT semantic extraction layer and a BiLSTM layer connected in sequence, but the specific parameters of the BERT semantic extraction layers and BiLSTM layers included in the three subnets are not completely the same.

Optionally, in some embodiments, the first task-specific sublayer includes a first feature conversion layer and a first label prediction layer connected in sequence; the second task-specific sublayer includes a second feature conversion layer and a second label prediction layer connected in sequence; and the third task-specific sublayer includes a third feature conversion layer and a third label prediction layer connected in sequence.

The following is an introduction to the feature conversion layers (the first feature conversion layer, the second feature conversion layer, and the third feature conversion layer) and the label prediction layers (the first label prediction layer, the second label prediction layer, and the third label prediction layer).

After the BiLSTM layer, this embodiment uses a feature conversion layer to map the hidden state vector h with n dimensions to k dimensions. Specifically, the feature conversion layer extracts sentence features using a matrix, denoted as P:

$$P = (p_1, p_2, \cdots, p_m) \in R^{m \times k},$$

where k is the number of labels, and the number of labels varies with different tasks. For example, the CE task involves 5 different labels, including "B-Cause, I-Cause, B-Effect, I-Effect" and "O".

The goal of the feature conversion layer is to convert the hidden state vector with n dimensions into a low-dimensional vector with k dimensions, thereby effectively extracting high-level features. By minimizing information loss during this process, simultaneous training of multiple tasks is achieved.

The label prediction layer uses the Conditional Random Field (CRF) algorithm for label prediction, that is, labeling the label of each word in a given sequence based on the calculation of the overall maximum probability, which is suitable for sequence labeling tasks with a large number of annotations.

For an input sentence $X=(x_1, x_2, x_3, \ldots, x_n)$ and a target label sequence $Y=(y_1, y_2, y_3, \ldots, y_n)$, where $x_i$ is the $i^{th}$ word of X, $y_i$ is the label of $x_i$, and n is the length of the input sentence and the target label sequence, and this embodiment defines the score of the entire label as follows:

$$s(X, Y) = \sum_{i=0}^{n-1} A_{y_i, y_{i+1}} + \sum_{i=1}^{n} P_{i, y_i}$$

where $s(\cdot)$ calculates the score of a given label sequence; $P \in \mathbb{R}^{n \times k}$ is the emission matrix, which represents the label vector generated from the BiLSTM layer and indicates which label is the mapping of the current $x_i$; $A \in \mathbb{R}^{(k+2) \times (k+2)}$ is the transition matrix that stores the score of transitioning from one label to another, where a higher score indicates a more probable transition; k is the number of labels; and $y_0$ and $y_n$ are the start and end of the sentence. The predicted label sequence can be obtained based on the score of the entire label sequence.

In this embodiment, the part-of-speech tagging task subnet includes a first BERT semantic extraction layer, a first BILSTM layer, a first feature conversion layer, and a first label prediction layer. The chunking analysis task subnet includes a second BERT semantic extraction layer, a second BiLSTM layer, a second feature conversion layer, and a second label prediction layer. The causal relation extraction task subnet includes a third BERT semantic extraction layer, a third BILSTM layer, a third feature conversion layer, and a third label prediction layer. The specific content of the BERT semantic extraction layer, BiLSTM layer, feature conversion layer, and label prediction layer of each subnet can be referred to the above content. For different tasks, the relevant parameters of each network layer included in different subnets may be the same or different.

Optionally, in some embodiments, the method further includes:

performing iterative training on the first layer of the to-be-trained denoising causal relation extraction model based on multi-task collaborative learning to obtain a trained model for the first layer of the denoising causal relation extraction model based on multi-task collaborative learning, where during the iterative training process, part of parameters of the part-of-speech tagging task subnet, the chunking analysis task subnet, and the causal relation extraction task subnet are iteratively pruned.

In this embodiment, in the task-sharing layer, the part-of-speech tagging task subnet, chunking analysis task subnet, and causal relation extraction task subnet first share the basic network architecture and basic parameters of the BERT and BiLSTM layers. Then, the Iterative Magnitude Pruning (IMP) technique is used to generate specific parameters for each subnet. Specifically, for each of the three tasks, namely, part-of-speech tagging, chunk tagging, and causal relation extraction, the Attention-related parameters in the BERT semantic extraction layer and the LSTM-related parameters in the BiLSTM layer are iteratively pruned, thereby obtaining subnet parameters for each task.

Therefore, in this embodiment, the Attention-related parameters in the BERT semantic extraction layer and the LSTM-related parameters in the BiLSTM layer of each subnet are unique to each subnet, while the remaining parameters are shared (i.e., identical). The above method can promote positive transfer learning while mitigating potential over-parameterization issues. Additionally, in this embodiment, the feature conversion layer and label prediction layer of each subnet are independent.

Through the above embodiments, during model training, a multi-task parallel training strategy is adopted, and sparse parameter sharing is performed on the task-sharing layer, which enables different tasks to obtain semantic complementary information. The first layer of the MPC-CE model can learn to denoise semantic components irrelevant to the causal relation extraction task. Therefore, it can achieve better performance in complex causal extraction scenarios, and can also process noisy single-source data and improve model performance.

Optionally, for each task, the goal is to maximize the log-likelihood probability of the correctly labeled sequence. In this embodiment, a Softmax function is used to calculate the scores of label results from two directions, and the conditional probability of the correct label sequence is obtained as:

$$p(Y_{true}|X) = \frac{e^{s(X,Y_{true})}}{\sum_{\tilde{Y} \in Y_X} e^{s(X,\tilde{Y})}}$$

where $Y_{true}$ is used to represent aground-truth label sequence, $Y_X$ is used to represent all possible label sequences, and s(•) is used to represent a score of a label sequence.

To reduce computational costs, for the sequence labels predicted by each task, their logarithmic values are used as follows:

$$\log p(Y_{true}|X) = s(X, Y_{true}) - \log \sum_{\tilde{Y} \in Y_x} e^{s(X,\tilde{Y})}$$

In this application, the loss functions for the three tasks are designed as negative log-likelihood functions, thereby obtaining a loss function for iterative training of the first layer of the to-be-trained denoising causal relation extraction model based on multi-task collaborative learning as follows:

$$loss_{task} = \{loss_{CE}, loss_{pos\ tagging}, loss_{chunk\ analysis}\};$$

$$loss_{task} = -\log p(Y_{true}|X).$$

$loss_{CE}$ is used to represent a loss function generated by the causal extraction task, $loss_{pos\ tagging}$ is used to represent a loss function generated by the part-of-speech tagging task, and $loss_{chunk\ analysis}$ is used to represent a loss function generated by the chunking analysis task.

In the training process of the first layer of the model, the iterative magnitude pruning technique is used to generate task subnets. The basic network of the model is denoted as $\xi$, and as a basic network, the corresponding model parameters are represented by $\theta\xi$. The masking matrix, denoted as $M_t$, is assumed to have binary values of 0 or 1, where 0 indicates parameter masking and 1 indicates parameter retention.

During the training process, for each of the three tasks, namely, part-of-speech tagging, chunk tagging, and causal relation extraction, the Attention-related parameters in the BERT semantic extraction layer and the LSTM-related parameters in the BiLSTM layer are iteratively pruned. This allows obtaining a Mask matrix for each task, as well as the basic network $\xi$ and the Mask matrix. Then, the parameters of the subnet corresponding to task t are obtained by element-wise multiplication of Mt and $\theta_\xi$, thereby obtaining the subnet structure, expressed as:

$$\xi^t = \xi(M_t \odot \theta_\xi).$$

To effectively reduce the parameter scale, the iterative magnitude pruning technique is adopted in this embodiment. This technique requires repeatedly pruning model parameters related to LSTM and Attention during the training process. Specifically, n iterations of pruning are performed, with one pruning operation executed after each training epoch, followed by generating a subnet for the corresponding task.

Optionally, in some embodiments, during a $n^{th}$ iterative training, a pruning rate for iteratively pruning part of parameters of the part-of-speech tagging task subnet, the chunking analysis task subnet, and the causal relation extraction task subnet satisfies:

$$p = (1 - \alpha)^{\frac{1}{n}}$$

where p is used to represent the pruning rate of each iteration, and $\alpha$ is used to represent a percentage of parameters retained in the part-of-speech tagging task subnet, the chunking analysis task subnet, and the causal relation extraction task subnet after the completion of iterative training.

The IMP technique can prune weight values that are below a predetermined threshold. This process effectively reduces the number of parameters and computational requirements while improving the efficiency of neural network training without affecting accuracy. In this embodiment, by selectively pruning network parameters, a compact representation of the network is obtained, which facilitates the construction of subnets customized for specific tasks. This, in turn, enables the model to learn in a more efficient manner while still maintaining a high level of accuracy on the task at hand.

The second layer of multi-task learning involves tasks including causal relation extraction and causal strength classification. An attention module capable of using causal strength representations to improve causal relation learning is designed, enabling the model to allocate more attention to causal relation extraction with high causal strength. In terms of causal strength classification, the second layer uses contrastive learning to enhance the representation learning of causal strength classification. Furthermore, using the idea of counterfactuals, when selecting negative samples, tokens with similar representations but significantly different meanings can be chosen. This maximizes the effect of contrastive learning and enables more effective learning of token representations.

Optionally, in some embodiments, the second layer includes a label attention module, a causal strength classification task, and a causal strength prior gated attention, specifically as follows:

The label attention module: In this module, the label attention mechanism is applied to the causal strength classification task and the causal relation extraction task to obtain explicit feature representations of the two tasks. In the first layer, an output vector of the BiLSTM layer is input to the Label Attention layer, which takes $H \in R^{n \times d}$ as Query, and $W_V \in R^{d \times V_{label}}$ as Key and Value. The explicit representations $H_V$ of the two tasks are obtained respectively through the following, where $V \in S$, R. Therefore, $H_S$ represents the token representation for causal relation extraction, and $H_R$ represents the token representation for causal strength classification. The expression of this module is as follows:

$$A_V = Softmax(HW_V^T)W_V$$

$$H_V = H + A_V.$$

Causal strength representation learning based on counterfactual negative sample contrastive learning: This method uses causal relations to guide causal strength learning, and adopts a transformer-based attention mechanism to perform representation learning for causal strength classification. By using different linear projections to map matrices $H_S$ and $H_R$ to Query ($Q_S$, $Q_R$), Key ($K_S$, $K_R$), and Value ($V_S$, $V_R$) matrices, and to enable the causal strength representation to contain corresponding causal relations, $Q_R$ is used as Query, $K_S$ as Key, and $V_S$ as Value to obtain the interactive attention $C_R$ for the causal strength classification task. Then, the output representation $H'_R \in R^{n \times d}$ of this layer is obtained through a normalization function, where LN represents a normalization function of this layer. The specific calculation is shown in the following formula.

$$C_R = Softmax\left(\frac{Q_R K_S^T}{\sqrt{d_k}}\right)V_S$$

$H'_R = LN(H_R + C_R)$. $H'_R$ is a causal strength representation containing causal relations, and $d_k$ is a dimension of a key vector.

In terms of training the second layer, this method adopts a contrastive learning method and constructs negative samples based on the counterfactual idea. When selecting negative samples, this method regards tokens with similar representations but different meanings as more suitable representations for negative samples. This can maximize the effect of contrastive learning and truly distinguish between positive and negative samples. Specifically, in training, a series of tokens with different meanings are selected, and then their representations are calculated using cosine similarity. The 10 representations with the smallest similarity are selected as negative samples. These negative samples are very close in the representation space but differ greatly in meaning, thus enabling more effective contrastive learning. The designed contrastive loss is as follows:

$$\mathcal{L}_{cl}^R = -\log \frac{\exp(\phi(H_R, H'_R)/\tau)}{\sum_{H_S^{neg} \in O} \exp(\phi(H_R, H_R^{neg})/\tau)}$$

where O represents a feature set of negative samples, $\tau$ denotes a temperature coefficient (set to 0.5 in this embodiment), and $\phi$ stands for a similarity function.

Causal strength prior gated attention: After obtaining token representations for causal strength classification, this method utilizes causal strength to improve the attention module for causal relation extraction representation learning. Unlike existing research that simply performs joint learning or interactive learning between causal strength representations and causal relation representations, this method adopts a more fine-grained gated attention mechanism, enabling the learned causal strength representations to be embedded into attention representations of causal relation extraction. Causal relation extraction is more effectively guided through causal strength, converting causal strength into attention weights for causal relation representation learning, thereby more accurately guiding the causal relation extraction process through causal strength. The improved causal strength prior gated attention includes the following:

Gating generator: Based on the learned representations for causal strength classification, this method uses a gating generator to obtain a channel gain and a temperature coefficient. The calculation method is as follows:

$$\gamma = \sigma(W_g H_R + b_g)$$

$$\beta = softplus(W_\beta H_R + b_\beta)$$

where $\sigma$ is a Sigmoid function, and softplus=log $(1+e^{-x})$, which is used to ensure that $\beta$ is a continuous positive value. The channel gain $\gamma$ acts as a feature-wise gating. In this method, by rescaling Query and Key dimension-wise, $\gamma$ introduces conditional sparsity in the latent space: when the causal strength label is high, $\gamma$ activates channels closely coupled with causal semantics and suppresses noise dimensions; when the strength is low, the overall channels tend to be closed, forcing the model to maintain a uniform attention distribution, thereby explicitly reducing the response to spurious causal cues. Its effect is equivalent to adding a strength-related regularized trajectory on the loss surface, improving the extraction discrimination boundary.

A temperature coefficient $\beta > 0$ acts as a sharpness controller. B enters the softmax denominator in a multiplicative manner, directly adjusting an attention entropy: a high $\beta$ value can amplify the entropy, generating a smooth distribution (for low-strength scenarios, to avoid overfitting weak causality); a low $\beta$ value can compress the entropy, producing a sharp distribution (for high-strength scenarios, to accurately focus on the cause-effect span). The constraint that $\beta$ is a continuous positive value is guaranteed by softplus, which ensures stable gradients during backpropagation. Moreover, it forms a monotonically invertible mapping on the manifold, facilitating end-to-end optimization of strength labels. The combination of the two enables the model to make accurate and fine-grained distinctions when dealing with "strong causality", and not be distracted by noise when dealing with "weak causality", resulting in a more stable and intelligent overall performance.

Gated attention calculation: For input queries $Q_S$, keys $K_S$, and values $V_S$, the following steps are performed:

(1) Dimension-wise gating, calculated as: $Q'=\gamma \odot Q_S$, $K'=\gamma \odot K_S$;

(2) Temperature scaling, calculated as: $S=Q'K'/(\sqrt{dB})$;

(3) Normalization, calculated as: A=softmax(S), $H'_S=A V_S$. $H'_S$ is a causal relation representation containing causal strength.

Then, the two vectors $H'_R \in R^{n \times d}$ and $H'_S \in R^{n \times d}$ are concatenated to obtain a new vector $H_{SR}$, as shown in the following formula:

$$H_{SR} = \left(h_{SR}^1, h_{SR}^2, \dots, h_{SR}^n\right); H_{SR} = H'_S \oplus H'_R.$$

Then, a feature representation of each word in the sentence is used to obtain semantic information of the words before and after the word, as shown in the following formula:

$$h_{(f,t)}^t = h_{SR}^{t-1} \oplus h_{SR}^t \oplus h_{SR}^{t+1}$$

$$H_{(f,t)} = \left(h_{(f,t)}^1, h_{(f,t)}^2, \dots, h_{(f,t)}^n\right)$$

Finally, causal strength information and causal relation information is implicitly fused through a feedforward neural network. Then, output vectors $\widetilde{H_S}$ and $\widetilde{H_R}$ for the two tasks are obtained through normalization functions respectively, with the specific calculations shown in the following formulas:

$$H_{(f,t)} = \left(h_{(f,t)}^1, h_{(f,t)}^2, \dots, h_{(f,t)}^t\right)$$

$$FFN(H_{(f,t)}) = \max(0, H_{(f,t)}W_1 + b_1)W_2 + b_2$$

$$\tilde{H}_S = LN(H'_S) + FNN(H_{(f,t)})$$

$$\tilde{H}_R = LN(H'_R) + FNN(H_{(f,t)}).$$

Causal strength classification: For the causal strength classification task, the maximum pooling operation is applied to $\tilde{H}_R$ to obtain a semantic representation C of the sentence, which is used as an input to a Softmax function. The label $O_R$ of causal strength is obtained through the following formula, where $w_R$ and $b_R$ are a weight matrix and bias term of causal strength, respectively. The calculation formula is as follows:

$$p_R = \text{Softmax}(w_R C + b_R)$$

$$O_R = \text{argmax}(p_R).$$

For the causal classification task, the same CRF decoder and corresponding loss function as those in the first layer are adopted.

The following will use specific experiments as examples to verify and analyze the performance of the MPC-CE model provided in this application (the abbreviation of the model for the method provided by the present disclosure, Multitask with POS and Chunk for Causal Relation, MPC-CE).

To label parts-of-speech (POS) and chunks based on existing causal relation extraction datasets, the embodiment of this application defines three types of labels to mark a given sentence in accordance with the labeling rules for POS tagging and chunking analysis. In this embodiment, NLTK is used to automatically tag POS and semantic chunks. The tagging format is shown in Table 1. Based on the tagging, the MPC-CE model can simultaneously complete three tasks: POS tagging, chunking analysis, and causal relation extraction.

TABLE 1

| Multi-label Data Sample from the SemEval2010-Task 8 Dataset | | | | | | |
|---|---|---|---|---|---|---|
| Sentence | Muscle | fatigue | is | the | number | One |
| POS | NNP | NN | VBZ | DT | NN | CD |
| Chunk | O | B-NP | O | B-NP | I-NP | O |
| CE | O | B-Cause | O | O | O | O |
| Sentence | cause | of | arm | muscle | pain | |
| POS | NN | IN | JJ | NN | NN | |
| Chunk | B-NP | O | B-NP | I-NP | B-NP | O |
| CE | O | O | O | O | B-Effect | O |

The SemEval-2010 Task 8 dataset is the most commonly used causal relation extraction dataset. In addition, considering that more types of causal relations can be included, in the experiment, the event datasets StoryLine v1.0 and Causal-TimeBank are combined to form a new causal relation extraction dataset called MTL-CE, which can verify the model's ability to extract different types of causal relations. To meet the dataset requirements of multi-task learning, NLTK is used here to perform part-of-speech tagging and chunk tagging on all CE datasets. The experiments evaluate each model on the SemEval-2010 Task 8 dataset and the MTL-CE dataset. The training set, validation set, and test set are divided in a ratio of 7:1.5:1.5. The statistical results of the two datasets are shown in Table 2.

TABLE 2

| Statistical Results of the Two Datasets | | | | |
|---|---|---|---|---|
| datasets | training | validation | testing | Total |
| SemEval-2010 Task 8 | 7501 (906) | 1608 (219) | 1608 (206) | 10717 (1331) |
| MTL-CE | 2438 (1219) | 522 (261) | 522 (261) | 3482 (1741) |

It should be understood that the numbers in parentheses represent the number of samples with causal relations.

For the part-of-speech (POS) tagging task, since the discourse tags are assigned to each word and do not involve word boundary issues, accuracy is used for evaluation. The Accuracy (ACC) metric is a simple and intuitive evaluation technique that measures the proportion of correct predictions made by a model. For the Chunking analysis (Chunk) task and Causal Relation Extraction (CE) task, Precision (P), Recall (R), and F1 Score (F1) are used as evaluation metrics.

In this experiment, different baseline models were selected for causal relation extraction for single-task learning and multi-task learning respectively. The following is an introduction to each single-task baseline model and multi-task baseline model.

Single-Task Baseline Models:
1. BiLSTM+CRF: BILSTM and CRF are for sequence labeling.
2. Flair: It is a toolkit utilizing BILSTM and CRF for various NLP tasks and supporting sequence labeling.
3. BiLSTM+LAN: BILSTM and a label attention mechanism are utilized to improve the performance of sequence labeling.
4. CNN+BILSTM: CNN and BiLSTM modules are introduced to extract semantic features from text.
5. BERT: Stacked Transformer encoders are used to pre-train on a large amount of text, which can be fine-tuned for various downstream NLP tasks.

6. BERT+BILSTM+CRF: BERT is combined with BiL-
STM and CRF for sequence labeling.

Multi-Task Baseline Models:

1. CNN+BILSTM: This multi-task learning method is
   proposed, which combines CNN and BiLSTM models
   to perform multiple NLP tasks simultaneously.
2. BERT+BiLSTM+MTL: Based on CNN+BiLSTM, the
   model in the present disclosure replaces the CNN
   module with BERT to perform multiple tasks.
3. BERT+BiLSTM+CRF+MTL: The model BERT+BiL-
   STM+MTL is further enhanced by adding CRF, mak-
   ing the model more comprehensive.

The experimental settings are as follows:

Experiments were conducted on the SemEval-2010 Task
8 and MTL-CE datasets, with hyperparameters set as fol-
lows: the iterative pruning rate was set to 10, the final
parameter reserve rate was 0.2, the learning rate was 1e-5 for
SemEval-2010 Task 8 and 5e-5 for MTL-CE, and Adam was
selected as the optimizer. For BiLSTM, the hidden vector
dimension was set to 256, and Dropout was set to 0.5 to
alleviate overfitting. The batch size was 32, and the number
of iterations was 50.

Parameter selection was performed on the validation set,
and then the optimal parameters were used to evaluate the
model performance on the test set. The obtained experimen-
tal results are shown in Tables 3 and 4.

TABLE 3

Experimental Results of Single-Task Learning
Models on the SemEval2010-Task 8 Dataset

| model | accuracy | recall | F1 |
|---|---|---|---|
| BILSTM + CRF | 67.21 | 65.53 | 66.36 |
| BILSTM + CRF + Flair | 75.97 | 66.75 | 71.06 |
| BILSTM + LAN | 73.99 | 71.12 | 72.52 |
| CNN + BILSTM | 74.79 | 63.35 | 68.59 |
| CNN + BILSTM + CRF | 73.46 | 66.50 | 69.81 |
| BERT | 74.00 | 75.68 | 74.83 |
| BERT + CRF | 79.60 | 72.72 | 76.01 |
| BERT + BILSTM | 75.49 | 75.49 | 74.49 |
| BERT + BILSTM + CRF | 78.64 | 75.00 | 76.77 |

TABLE 4

Experimental Results of Single-Task Learning
Models on the MTL-CE Dataset

| model | accuracy | recall | F1 |
|---|---|---|---|
| BILSTM + CRF | 67.62 | 58.91 | 62.97 |
| BILSTM + CRF + Flair | 72.84 | 65.15 | 68.78 |
| BILSTM + LAN | 70.31 | 68.32 | 69.30 |
| CNN + BILSTM | 70.48 | 64.78 | 67.50 |
| CNN + BILSTM + CRF | 69.94 | 65.28 | 67.52 |
| BERT | 70.16 | 74.35 | 72.19 |
| BERT + CRF | 74.33 | 70.36 | 72.79 |
| BERT + BILSTM | 70.05 | 73.24 | 71.61 |
| BERT + BILSTM + CRF | 74.18 | 72.52 | 73.34 |

Among the 4 evaluated BERT-based models, the BERT+
BiLSTM+CRF model achieved F1 scores of 76.77% and
73.34% on the two datasets respectively, which is the best
performance among all baseline methods. It can be observed
from the results in the table that BiLSTM+CRF+Flair per-
forms better than BiLSTM+CRF, and CNN+BILSTM CNN
also performs better than CNN+BILSTM. This is because
CNN and Flair adopt character-level vector representation
learning, which can capture more fine-grained semantic
information, thereby significantly improving extraction performance. In addition, it is found that introducing BERT can
significantly improve the performance of all 4 models on
both datasets. This is not surprising, as BERT has shown
advantages in a wide range of NLP tasks due to its ability to
capture global information. By comparing the model per-
formance on the two datasets, it can be further found that
these single-task methods perform worse on the MTL-CE
dataset than on the SemEval2010-Task 8 dataset. This
indicates that these single-task methods cannot effectively
perform accurate causal relation extraction when faced with
different types of causal relations across multiple domains.

TABLE 5

Multi-Task Learning Performance of Models on the SemEval2010-
Task 8 Dataset

| | POS | Chunk | | | CE | | |
|---|---|---|---|---|---|---|---|
| model | ACC | P | R | F1 | P | R | F1 |
| CNN + BiLSTM | 96.33 | 92.07 | 90.99 | 91.53 | 77.94 | 64.32 | 70.48 |
| CNN + BiLSTM + CRF | 96.12 | 90.29 | 91.53 | 90.90 | 75.59 | 71.64 | 73.56 |
| BERT + BiLSTM | 96.37 | 92.24 | 91.87 | 92.14 | 75.94 | 78.16 | 77.03 |
| BERT + BiLSTM + CRF | 96.47 | 90.96 | 92.49 | 91.72 | 77.86 | 77.67 | 77.76 |
| MPC-CE | 96.46 | 91.89 | 92.31 | 92.10 | 80.56 | 77.43 | 78.96 |

TABLE 6

Multi-Task Learning Results of Various Models on the MTL-CE Dataset

| | POS | Chunk | | | CE | | |
|---|---|---|---|---|---|---|---|
| model | ACC | P | R | F1 | P | R | F1 |
| CNN + BiLSTM | 95.99 | 93.30 | 92.04 | 92.77 | 70.91 | 68.44 | 69.65 |
| CNN + BiLSTM + CRF | 95.92 | 93.97 | 91.17 | 92.55 | 71.53 | 68.54 | 70.00 |
| BERT + BiLSTM | 96.51 | 92.72 | 92.26 | 92.49 | 74.59 | 72.21 | 73.38 |
| BERT + BiLSTM + CRF | 96.39 | 90.92 | 92.23 | 91.57 | 75.63 | 76.21 | 75.92 |
| MPC-CE | 96.40 | 91.15 | 92.43 | 91.78 | 76.46 | 76.46 | 76.46 |

The experimental results of models based on multi-task
learning are shown in Tables 5 and 6. It can be found that the
proposed MPC-CE outperforms other existing multi-task
learning models on both datasets. The multi-task learning
models show significant improvements in performance on
POS, Chunk, and CE tasks, which highlights the efficacy of
MTL (Multi-Task Learning) in enhancing task performance.
The CE task achieves an F1 score of 78.96% on the
SemEval-2010 Task 8 dataset and 76.46% on the MTL-CE
dataset. It can also be observed that MPC-CE increases the
F1 score of CE by 2.19%, achieving the best performance
among all models. Notably, compared with its STL (Single-
Task Learning) version (BERT+BiLSTM+CRF), MPC-CE
achieves a 3.12% improvement on the MTL-CE dataset—
this improvement is more significant than that of other
baseline methods, which proves the effectiveness of MPC-
CE in handling causal noisy data.

In this embodiment, a sparse shared parameter strategy is
also adopted. To verify the ability of this strategy to improve
training efficiency, it conducted a statistical analysis of the
model's training time. The MPC-CE model achieves con-
vergence in approximately 10 hours on a server equipped
with 2 RTX 3090 GPUs. Compared with the training time
without sparse sharing, the convergence speed of the MPC-
CE model shows a significant improvement, which confirms
the remarkable advantage of the MPC-CE model in accel-
erating the convergence of training data. The substantial
reduction in training time can be attributed to the strategic
integration of the parameter sharing mechanism in MPC-CE. The MPC-CE model not only outperforms various baseline methods in terms of training speed but also paves the way for simplified and time-efficient model learning, laying a foundation for enhancing the model's practicality.

An analysis of the multiple iterative pruning in sparse sharing reveals that the optimal number of interactive pruning steps varies across different datasets, as can be seen from these two figures. On the SemEval-2010 Task 8 dataset, the optimal number of iterations for POS, Chunk, and CE tasks are 1, 3, and 4 respectively. On the other hand, the optimal number of iterations for the three tasks on the MTL-CE dataset are 3, 8, and 3 respectively.

As indicated by the above-mentioned experiments, the MPC-CE model proposed in this application can use more information from other tasks relevant to causal relation extraction to address the issue of noisy data in causal relation extraction. By modeling multiple tasks simultaneously, the model can better understand linguistic structures and semantic roles, thereby effectively filtering out noisy data. Furthermore, in the MPC-CE model, parameter correction is performed on the task-sharing layer, specifically, redundant parameters are pruned during the training process, and only the most widely beneficial parameters are retained. This enhances the model's generalization ability. Empirical results on the two datasets show that compared with baseline models, the F1 score is improved by 2.19% and 3.12% respectively. These results demonstrate that the MPC-CE model can effectively enhance causal relation extraction through in-depth semantic mining and improve the model's ability to mitigate noisy data.

Figure 4:
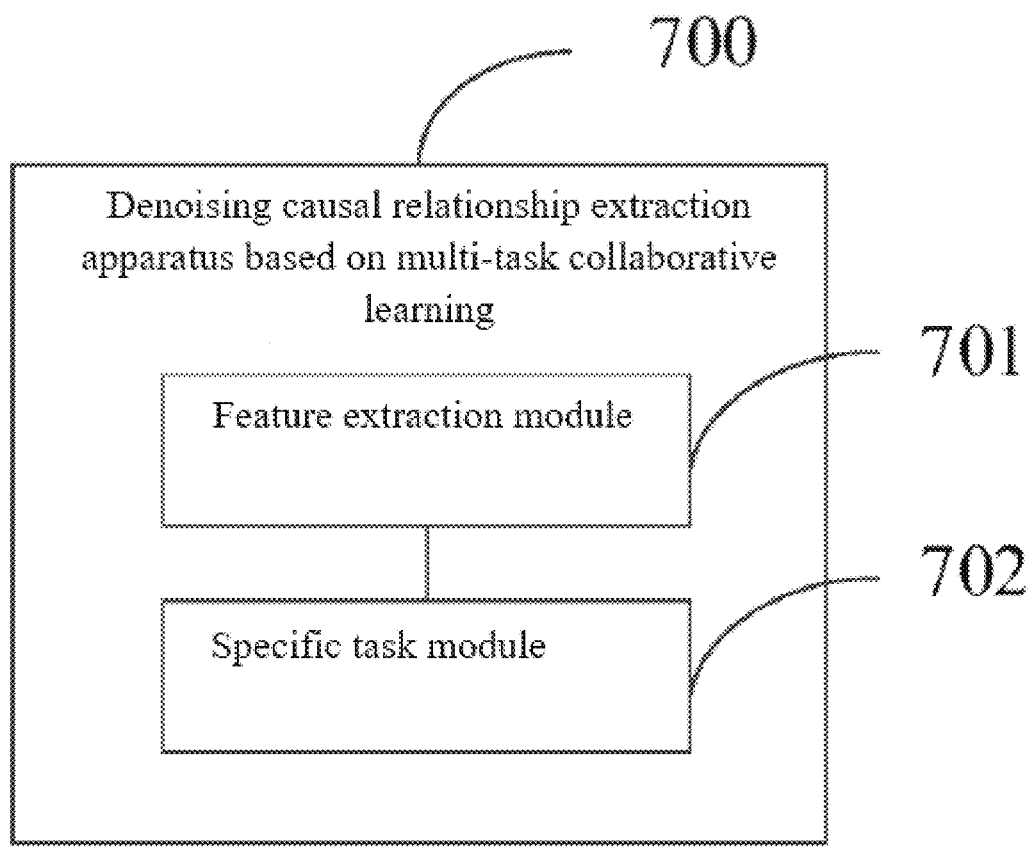
FIG. 4 is a schematic diagram of a denoising causal relation extraction device based on multi-task collaborative learning in the present disclosure.

Please refer to FIG. 4. An embodiment of the present disclosure further provides a denoising causal relation extraction device 700 based on multi-task collaborative learning, which includes:

a feature extraction module 701, configured to input a text to be processed into a task-sharing layer of a denoising causal relation extraction model based on multi-task collaborative learning for feature extraction to obtain an extraction result; and a task-specific module 702, including a first layer and a second layer, where:

the first layer is configured to input the extraction result into the task-specific layer of the denoising causal relation extraction model based on multi-task collaborative learning to perform a part-of-speech tagging task, a chunking analysis task, and a causal extraction task, and obtain a feature label corresponding to the part-of-speech tagging task, a feature label corresponding to the chunking analysis task, and a feature label corresponding to the causal extraction task respectively, where the denoising causal relation extraction model based on multi-task collaborative learning is obtained by parallel training of the part-of-speech tagging task, the chunking analysis task and the causal extraction task; and the second layer applies a label attention mechanism to a causal strength classification task and a causal relation extraction task to obtain explicit feature representations of the two tasks; and conducting causal strength representation learning based on counterfactual negative sample contrastive learning, using a gating generator to obtain a channel gain and a temperature control coefficient, which are applied to gated attention calculation, so as to realize causal strength classification and guide the extraction of causal relations through causal strength.

Optionally, the first layer of the denoising causal relation extraction model based on multi-task collaborative learning includes:

a part-of-speech tagging task subnet, including a first task-sharing sublayer and a first task-specific sublayer, where the first task-sharing sublayer is used for feature extraction on the text to be processed to obtain a first extraction result, and the first task-specific sublayer is used for part-of-speech tagging based on the first extraction result to obtain a feature label corresponding to the part-of-speech tagging task;

a chunking analysis task subnet, including a second task-sharing sublayer and a second task-specific sublayer, where the second task-sharing sublayer is used for feature extraction on the text to be processed to obtain a second extraction result, and the second task-specific sublayer is used for chunking analysis based on the second extraction result to obtain a feature label corresponding to the chunking analysis task; and a causal relation extraction task subnet, including a third task-sharing sublayer and a third task-specific sublayer, where the third task-sharing sublayer is used for feature extraction on the text to be processed to obtain a third extraction result, and the third task-specific sublayer is used for causal extraction based on the third extraction result to obtain a feature label corresponding to the causal extraction task, where the task-sharing layer includes the first task-sharing sublayer, the second task-sharing sublayer and the third task-sharing sublayer, and the task-specific layer includes the first task-specific sublayer, the second task-specific sublayer and the third task-specific sublayer.

Optionally, the first task-specific sublayer includes a first feature conversion layer and a first label prediction layer connected in sequence; the second task-specific sublayer includes a second feature conversion layer and a second label prediction layer connected in sequence; and the third task-specific sublayer includes a third feature conversion layer and a third label prediction layer connected in sequence.

Optionally, the denoising causal relation extraction device 700 based on multi-task collaborative learning further includes:

an iterative training module, configured to perform iterative training on the to-be-trained denoising causal relation extraction model based on multi-task collaborative learning, so as to obtain the denoising causal relation extraction model based on multi-task collaborative learning, where during the iterative training process, part of parameters of the part-of-speech tagging task subnet, the chunking analysis task subnet, and the causal relation extraction task subnet are iteratively pruned.

Optionally, a loss function for iterative training of the to-be-trained denoising causal relation extraction model based on multi-task collaborative learning is:

$$loss_{task} = \{loss_{CE}, loss_{pos\ tagging}, loss_{chunk\ analysis}\};$$

$$loss_{task} = -\log p(Y_{true}|X);$$

$$\log p(Y_{true}|X) = s(X, Y_{true}) - \log \sum_{\tilde{Y} \in Y_x} e^{s(X, \tilde{Y})},$$

where $Y_{true}$ is used to represent the ground-truth label sequence, $Y_X$ is used to represent all possible label sequences, $s(\cdot)$ is used to represent a score of a label sequence, $loss_{CE}$ is used to represent a loss function generated by the causal extraction task, $loss_{pos\ tagging}$ is used to represent a loss function generated by the part-of-speech tagging task, and $loss_{chunk\ analysis}$ is used to represent a loss function generated by the chunking analysis task.

Optionally, during a $n^{th}$ iterative training, a pruning rate for iteratively pruning part of parameters of the part-of-speech tagging task subnet, the chunking analysis task subnet, and the causal relation extraction task subnet satisfies:

$$p = (1-\alpha)^{\frac{1}{n}},$$

where p is used to represent the pruning rate of each iteration, and a is used to represent a percentage of parameters retained in the part-of-speech tagging task subnet, the chunking analysis task subnet, and the causal relation extraction task subnet after the completion of iterative training.

Optionally, the second layer includes a label attention module, a causal strength classification task, and a causal strength prior gated attention.

Optionally, the label attention module applies the label attention mechanism to the causal strength classification task and the causal relation extraction task to obtain explicit feature representations of the two tasks. In the explicit representations Hy of the two tasks, $V \in S$, R, where $H_S$ represents the token representation for causal relation extraction, and $H_R$ represents the token representation for causal strength classification.

Optionally, the second layer uses causal relations to guide causal strength learning, and adopts a transformer-based attention mechanism to perform representation learning for causal strength classification, obtaining a causal strength representation $H'_R$ that contains causal relations. The training adopts a contrastive learning method, with negative samples constructed based on the counterfactual idea. When selecting negative samples, a series of tokens with different meanings are chosen, and then their representations are calculated using cosine similarity. The 10 representations with the smallest similarity are selected as negative samples. The designed contrastive loss is as follows:

$$\mathcal{L}_{cl}^{R} = -\log \frac{\exp(\phi(H_R, H'_R)/\tau)}{\sum_{H_S^{neg} \in O} \exp(\phi(H_R, H_R^{neg})/\tau)}$$

where O represents a feature set of negative samples, and t represents a temperature control coefficient, which is 0.5 in this embodiment.

Optionally, the causal strength prior gated attention module improves causal relation extraction representation learning using causal strength. The causal strength prior gated attention module includes a gating generator. Based on the learned representations for causal strength classification, the gating generator is used to obtain a channel gain and a temperature control coefficient, with a calculation method as follows:

$$\gamma = \sigma(W_g H_R + b_g)$$

$$\beta = \text{softplus}(W_\beta H_R + b_\beta)$$

where $\sigma$ is a Sigmoid function, and softplus-log $(1+e^{-x})$, which is used to ensure that $\beta$ is a continuous positive value. The channel gain $\gamma$ acts as a feature-wise gating. In this method, by rescaling Query and Key dimension-wise, $\gamma$ introduces conditional sparsity in the latent space; a temperature coefficient $\beta > 0$ acts as a distribution sharpness controller for gated attention calculation. For gated attention calculation, first, the causal relation representation $H'_S$ containing causal strength is computed; then, the two vectors $H'_R \in R^{n \times d}$ and $H'_S \in R^{n \times d}$ are concatenated to obtain a new vector $H_{SR}$. After that, for each word in the sentence, a feature representation of the word is used to obtain semantic information of the words before and after it.

Optionally, the causal classification task adopts the same CRF decoder and corresponding loss function as the first layer.

The denoising causal relation extraction device 700 based on multi-task collaborative learning provided in the embodiment of the present application can execute the above method embodiments, and its implementation principle and technical effects are similar, which will not be repeated here.

It should be noted that the division of units in the embodiments of the present application is exemplary, and is only a logical function division, and there may be other division methods in actual implementation. In addition, each functional unit in each embodiment of the present application may be integrated into one processing unit, or each unit may exist physically independently, or two or more units may be integrated into one unit. The above-mentioned integrated units can be implemented in the form of hardware or in the form of software functional units.

If the integrated unit is implemented in the form of a software functional unit and sold or used as an independent product, it can be stored in a processor-readable storage medium. Based on this understanding, the technical solution of the present application, in essence, the part that contributes to the prior art, or all or part of the technical solution, can be embodied in the form of a software product. The computer software product is stored in a storage medium and includes several instructions to enable a computer device (which may be a personal computer, a server, a network device, and the like) or a processor to execute all or part of the steps of the methods described in the various embodiments of the present application. The above-mentioned storage media include: USB flash drives, mobile hard drives, Read-Only Memory (ROM), Random Access Memory (RAM), magnetic disks, optical discs, and various other media that can store program codes.

Figure 5:
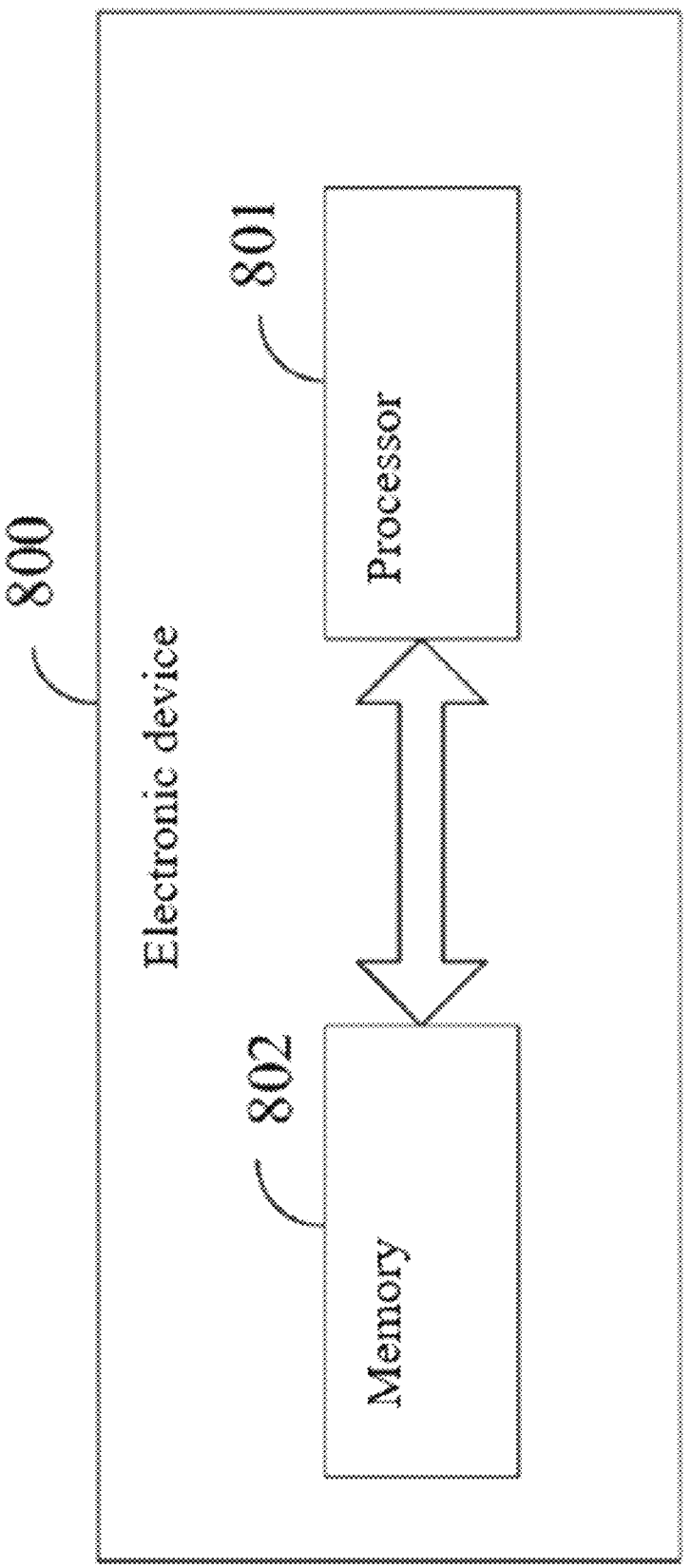
FIG. 5 is a schematic structural diagram of an electronic device in the present disclosure.

As shown in FIG. 5, an embodiment of the present application provides an electronic device 800, including: a memory 802, a processor 801, and a program stored in the memory 802 and executable on the processor 801. The processor 801 is configured to read the program in the memory 802 to implement the steps in the method for denoising causal relation extraction based on multi-task collaborative learning as described above.

The embodiment of the present application further provides a readable storage medium, on which a program is stored. The program, when executed by a processor, implements each process of the above-mentioned embodiment of the method for denoising causal relation extraction based on multi-task collaborative learning, and can achieve the same technical effect. To avoid repetition, details are not repeated here. The readable storage medium may be any available medium or data storage device accessible to a processor, including but not limited to magnetic memories (such as floppy disks, hard disks, magnetic tapes, Magneto-Optical Disks (MO), and the like), optical memories (such as Compact Disks (CD), Digital Versatile Discs (DVD), Blu-ray Discs (BD), High-Definition Versatile Discs (HVD), and the like), and semiconductor memories (such as Read-Only Memory (ROM), Erasable Programmable Read-Only Memory (EPROM), Electrically Erasable Programmable Read-Only Memory (EEPROM), NAND FLASH, Solid State Disks (SSD), and the like).

It should be noted that, in this document, the terms "comprise", "include" or any other variations thereof are intended to cover a non-exclusive inclusion, such that a process, method, article or device that includes a series of elements not only includes those elements but also includes other elements not explicitly listed, or further includes elements inherent to such process, method, article or device. Without further limitations, an element defined by the phrase "comprises/includes a . . . " does not exclude the presence of additional identical elements in the process, method, article or device that includes the element.

Through the description of the above implementation modes, those skilled in the art can clearly understand that the methods of the above embodiments can be implemented by software plus a necessary general hardware platform; of course, they can also be implemented by hardware, but in many cases, the former is a better implementation mode. Based on this understanding, the technical solution of the present application—in essence, the part that contributes to the prior art—can be embodied in the form of a software product. The computer software product is stored in a storage medium (such as ROM/RAM, magnetic disk, optical disc) and includes several instructions to enable a terminal (which may be a mobile phone, a computer, a server, an air conditioner, a network device, and the like) to execute the methods described in the various embodiments of the present application.

The embodiments of the present application have been described above with reference to the accompanying drawings. However, the present application is not limited to the above specific implementations; the above specific implementations are merely illustrative rather than restrictive. Under the inspiration of the present application, a person of ordinary skill in the art can make many other forms without departing from the purpose of the present application and the scope protected by the claims, all of which fall within the protection scope of the present application.

What is claimed is:

1. A method for denoising causal relation extraction based on multi-task collaborative learning, comprising:

inputting a text to be processed into a task-sharing layer of a denoising causal relation extraction model based on multi-task collaborative learning for feature extraction to obtain an extraction result;

inputting the extraction result into the task-specific layer of the denoising causal relation extraction model based on multi-task collaborative learning to perform a part-of-speech tagging task, a chunking analysis task, and a causal extraction task, and obtaining a feature label corresponding to the part-of-speech tagging task, a feature label corresponding to the chunking analysis task, and a feature label corresponding to the causal extraction task respectively, wherein a first layer of the denoising causal relation extraction model based on multi-task collaborative learning is obtained by parallel training of the part-of-speech tagging task, the chunking analysis task and the causal extraction task; and applying a label attention mechanism to a causal strength classification task and a causal relation extraction task to obtain explicit feature representations of the two tasks; and conducting causal strength representation learning based on counterfactual negative sample contrastive learning, using a gating generator to obtain a channel gain and a temperature control coefficient, which are applied to gated attention calculation, so as to realize causal strength classification and guide the extraction of causal relations through causal strength.

2. The method according to claim 1, wherein the first layer of the denoising causal relation extraction model based on multi-task collaborative learning comprises:

a part-of-speech tagging task subnet, comprising a first task-sharing sublayer and a first task-specific sublayer, wherein the first task-sharing sublayer is used for feature extraction on the text to be processed to obtain a first extraction result, and the first task-specific sublayer is used for part-of-speech tagging based on the first extraction result to obtain a feature label corresponding to the part-of-speech tagging task;

a chunking analysis task subnet, comprising a second task-sharing sublayer and a second task-specific sublayer, wherein the second task-sharing sublayer is used for feature extraction on the text to be processed to obtain a second extraction result, and the second task-specific sublayer is used for chunking analysis based on the second extraction result to obtain a feature label corresponding to the chunking analysis task; and a causal relation extraction task subnet, comprising a third task-sharing sublayer and a third task-specific sublayer, wherein the third task-sharing sublayer is used for feature extraction on the text to be processed to obtain a third extraction result, and the third task-specific sublayer is used for causal extraction based on the third extraction result to obtain a feature label corresponding to the causal extraction task, wherein the task-sharing layer comprises the first task-sharing sublayer, the second task-sharing sublayer and the third task-sharing sublayer, and the task-specific layer comprises the first task-specific sublayer, the second task-specific sublayer and the third task-specific sublayer.

3. The method according to claim 2, wherein the first task-sharing sublayer comprises a first Bidirectional Encoder Representations from Transformers (BERT) semantic extraction layer and a first Bidirectional Long Short-Term Memory (BiLSTM) layer connected in sequence; the second task-sharing sublayer comprises a second BERT semantic extraction layer and a second BILSTM layer connected in sequence; and the third task-sharing sublayer comprises a third BERT semantic extraction layer and a third BiLSTM layer connected in sequence, wherein part of parameters of the first BERT semantic extraction layer, the second BERT semantic extraction layer and the third BERT semantic extraction layer are the same; and part of parameters of the first BILSTM layer, the second BIL-STM layer and the third BiLSTM layer are the same.

4. The method according to claim 2, wherein the first task-specific sublayer comprises a first feature conversion layer and a first label prediction layer connected in sequence; the second task-specific sublayer comprises a second feature conversion layer and a second label prediction layer connected in sequence; and the third task-specific sublayer comprises a third feature conversion layer and a third label prediction layer connected in sequence.

5. The method according to claim 3, wherein the method further comprises:

performing iterative training on a first layer of a to-be-trained denoising causal relation extraction model based on multi-task collaborative learning to obtain the denoising causal relation extraction model based on multi-task collaborative learning, wherein during the iterative training process, part of parameters of the part-of-speech tagging task subnet, the chunking analysis task subnet, and the causal relation extraction task subnet are iteratively pruned.

6. The method according to claim 5, wherein a loss function for iterative training of the first layer of the to-be-trained denoising causal relation extraction model based on multi-task collaborative learning is:

$$\text{loss}_{task} = \{\text{loss}_{CE}, \text{loss}_{pos\ tagging}, \text{loss}_{chunk\ analysis}\};$$

$$\text{loss}_{task} = -\log p(Y_{true}|X);$$

$$\log p(Y_{true}|X) = s(X, Y_{true}) - \log \sum_{\tilde{Y} \in Y_X} e^{s(X, \tilde{Y})},$$

wherein $Y_{true}$ is used to represent a ground-truth label sequence, $Y_X$ is used to represent all possible label sequences, $s(\bullet)$ is used to represent a score of a label sequence, $\text{loss}_{CE}$ is used to represent a loss function generated by the causal extraction task, $\text{loss}_{pos\ tagging}$ is used to represent a loss function generated by the part-of-speech tagging task, and $\text{loss}_{chunk\ analysis}$ is used to represent a loss function generated by the chunking analysis task.

7. The method according to claim 5, wherein during a $n^{th}$ iterative training, a pruning rate for iteratively pruning part of parameters of the part-of-speech tagging task subnet, the chunking analysis task subnet, and the causal relation extraction task subnet satisfies:

$$p = (1 - \alpha)^{\frac{1}{n}},$$

wherein p is used to represent the pruning rate of each iteration, and $\alpha$ is used to represent a percentage of parameters retained in the part-of-speech tagging task subnet, the chunking analysis task subnet, and the causal relation extraction task subnet after the completion of iterative training.

8. The method according to claim 1, wherein a second layer of the denoising causal relation extraction model based on multi-task collaborative learning comprises a label attention module, a causal strength classification task, and a causal strength prior gated attention; the label attention module applies the label attention mechanism to the causal strength classification task and the causal relation extraction task to obtain explicit feature representations of the two tasks, comprising token representation $H_S$ for causal relation extraction and token representation $H_R$ for causal strength classification; causal relations are used to guide causal strength learning, a transformer-based attention mechanism is adopted to perform representation learning for causal strength classification, and causal strength representation $H'_R$ that contains causal relations is obtained; the causal strength representation learning based on counterfactual negative sample contrastive learning is also adopted; and the causal strength prior gated attention embeds the learned causal strength representation into attention representation of causal relation extraction, so as to guide the extraction of causal relations.

9. The method according to claim 1, wherein matrix $H_S$ and matrix $H_R$ are respectively mapped to Query matrix $Q_S$, Key matrix $K_S$, Value matrix $V_S$, as well as Query matrix $Q_R$, Key matrix $K_R$, Value matrix $V_R$ by using different linear projections; then, the representation $C_R$ of the causal strength classification task after attention calculation is computed; and the specific calculation of the causal strength representation $H'_R$ that contains causal relations is shown in the following formula:

$$C_R = \text{Softmax}\left(\frac{Q_R K_S^T}{\sqrt{d_k}}\right) V_S$$

$$H'_R = LN(H_R + C_R),$$

wherein LN represents a normalization function of this layer, and $d_k$ is a dimension of a key vector;

the causal strength representation learning based on counterfactual negative sample contrastive learning comprises: selecting a series of tokens with different meanings during training, then calculating representations through cosine similarity, and finding several representations with the smallest similarity as negative samples to implement contrastive learning, a contrastive loss being as follows:

$$\mathcal{L}_{cl}^R = -\log \frac{\exp\left(\phi(H_R, H'_R)/\tau\right)}{\sum_{H_S^{neg} \in O} \exp\left(\phi(H_R, H_R^{neg})/\tau\right)}$$

wherein O represents a feature set of negative samples, $\tau$ represents a temperature control coefficient, and $\phi$ represents a similarity function.

10. The method according to claim 1, wherein a calculation method for obtaining the channel gain and the temperature control coefficient by the gate generator of the causal strength prior gated attention is as follows:

$$\gamma = \sigma(W_g H_R + b_g)$$

$$\beta = \text{softplus}(W_\beta H_R + b_\beta)$$

wherein $\sigma$ is a Sigmoid function, and softplus=log $(1 + e^{-x})$, which is used to ensure that $\beta$ is a continuous positive value; the channel gain $\gamma$ acts as a feature-wise gating, and $\gamma$ introduces conditional sparsity in the latent space through dimension-wise rescaling of Query and Key; a temperature coefficient $\beta > 0_{acts}$ as a distribution sharpness controller, and $\beta$ enters the denominator of softmax in a multiplicative manner to directly adjust an attention entropy.

11. The method according to claim 1, wherein the gated attention calculation comprises: for the input query $Q_S$, key $K_S$, and value $V_S$, sequentially performing dimension-wise gating, temperature scaling, and normalization to obtain a causal relation representation $H'_S$ containing causal strength, with the calculation formulas as follows: $Q' = \gamma \odot Q_S$, $K'=\gamma\odot K_S$; $S=Q'K'/(\sqrt{dB})$; $A=softmax(S)$, $H'_S=AV_S$; then, concatenating the two vectors $H'_R\in R^{n\times d}$ and $H'_S\in R^{n\times d}$ to obtain a new vector $H_{SR}$; then, for each word in the sentence, using a feature representation of the word to obtain semantic information of the words before and after the word; finally, implicitly fusing causal strength information and causal relation information through a feedforward neural network, and obtaining output vectors $\widetilde{H_S}$ and $\widetilde{H_R}$ of the two tasks respectively through a normalization function.

12. The method according to claim 1, wherein in the causal strength classification task, a max-pooling operation is applied to $\tilde{H}_R$ to obtain a semantic representation C of the sentence, which is used as an input to a Softmax function, and a label $O_R$ of the causal strength is obtained through the following formula, wherein $w_R$ and $b_R$ are respectively a weight matrix and bias term of the causal strength; and the calculation formula is as follows:

$$p_R = \text{Softmax}(w_R C + b_R)$$

$$O_R = \text{argmax}(p_R)$$

the causal classification task adopts the same crf decoder and corresponding loss function as those used in the first layer.

13. A denoising causal relation extraction device based on multi-task collaborative learning, comprising: a memory, a processor, and a program stored in the memory and executable on the processor, wherein the processor is configured to read the program in the memory to implement the steps in the method comprising:

a feature extraction module, comprising a Bidirectional Encoder Representations from Transformers (BERT) semantic extraction layer and a Bidirectional Long Short-Term Memory (BILSTM) layer, configured to input a text to be processed into a task-sharing layer of a denoising causal relation extraction model based on multi-task collaborative learning for feature extraction to obtain an extraction result; and a task-specific module, comprising a first layer and a second layer, wherein: the first layer is configured to input the extraction result into the task-specific layer of the denoising causal relation extraction model based on multi-task collaborative learning to perform a part-of-speech tagging task, a chunking analysis task, and a causal extraction task, and obtain a feature label corresponding to the part-of-speech tagging task, a feature label corresponding to the chunking analysis task, and a feature label corresponding to the causal extraction task respectively, wherein the denoising causal relation extraction model based on multi-task collaborative learning is obtained by parallel training of the part-of-speech tagging task, the chunking analysis task and the causal extraction task; and the second layer applies a label attention mechanism to a causal strength classification task and a causal relation extraction task to obtain explicit feature representations of the two tasks; and conducting causal strength representation learning based on counterfactual negative sample contrastive learning, using a gating generator to obtain a channel gain and a temperature control coefficient, which are applied to gated attention calculation, so as to realize causal strength classification and guide the extraction of causal relations through causal strength.

14. An electronic device, comprising: a memory, a processor, and a program stored in the memory and executable on the processor, wherein the processor is configured to read the program in the memory to implement the steps in the method for denoising causal relation extraction based on multi-task collaborative learning according to claim 1.

15. A non-transitory readable storage medium for storing a program, wherein the program, when executed by a processor, implements the steps in the method for denoising causal relation extraction based on multi-task collaborative learning according to claim 1.

* * * * *